US010794875B2

(12) United States Patent
Masuda

(10) Patent No.: US 10,794,875 B2
(45) Date of Patent: Oct. 6, 2020

(54) GAS CHROMATOGRAPH

(71) Applicant: Shimadzu Corporation, Kyoto (JP)

(72) Inventor: Shingo Masuda, Kyoto (JP)

(73) Assignee: Shimadzu Corporation, Kyoto (JP)

(*) Notice: Subject to any disclaimer, the term of this patent is extended or adjusted under 35 U.S.C. 154(b) by 191 days.

(21) Appl. No.: 16/199,385

(22) Filed: Nov. 26, 2018

(65) Prior Publication Data
US 2020/0166484 A1 May 28, 2020

(51) Int. Cl.
G01N 30/32 (2006.01)
G01N 30/64 (2006.01)
G01N 30/72 (2006.01)
G01N 30/46 (2006.01)
G01N 30/16 (2006.01)
(Continued)

(52) U.S. Cl.
CPC ............ G01N 30/32 (2013.01); G01N 30/16 (2013.01); G01N 30/30 (2013.01); G01N 30/466 (2013.01); G01N 30/64 (2013.01); G01N 30/7206 (2013.01); G01N 2030/025 (2013.01); G01N 2030/3084 (2013.01); G01N 2030/324 (2013.01)

(58) Field of Classification Search
CPC .... G01N 30/32; G01N 30/64; G01N 30/7206; G01N 30/466; G01N 30/16; G01N 30/30; G01N 2020/025; G01N 2020/3084; G01N 2020/324
USPC ...................................... 73/23.42
See application file for complete search history.

(56) References Cited

U.S. PATENT DOCUMENTS 5,915,269 A 6/1999 Cahill et al.
2011/0100093 A1* 5/2011 Kawana ............. G01N 30/8658
73/23.42
(Continued)

FOREIGN PATENT DOCUMENTS

JP H04-138359 A 5/1992
JP H09-43220 A 2/1997
JP H10-325835 A 12/1998
(Continued)

OTHER PUBLICATIONS

Office Action dated May 7, 2019, in corresponding Japanese Application No. 2016-103166; 7 pages.
(Continued)

Primary Examiner — Tarun Sinha
(74) Attorney, Agent, or Firm — Maier & Maier, PLLC

(57) ABSTRACT

A gas chromatograph, which may have a complex device configuration, capable of starting an analysis by replacing residual gas in a column with a carrier gas in starting up the gas chromatograph and by increasing the temperature of a column oven to an analytical initial temperature immediately after completion of the replacement.

Upon command to start a gas chromatograph, a control unit calculates the average linear velocity of a carrier gas using a formula based on information such as the inner diameter and the length of a column, the column head pressure and the column outlet pressure, and the type of carrier gas, which are set as analytical conditions, and, for example, based on a detected temperature of a column oven and further calculates gas replacement necessary time from the average linear velocity and the length of the column. Based on the calculated time, a start time is determined.

6 Claims, 10 Drawing Sheets

(51) Int. Cl.
*G01N 30/30* (2006.01)
*G01N 30/02* (2006.01)

(56) References Cited

U.S. PATENT DOCUMENTS

2014/0352406 A1* 12/2014 Kawana ................ G01N 30/38
73/23.42
2015/0253286 A1 9/2015 Shinada et al.

FOREIGN PATENT DOCUMENTS

| | | |
|---|---|---|
| JP | 2007-3190 A | 1/2007 |
| JP | 2010-203951 A | 9/2010 |
| JP | 2013-44647 A | 3/2013 |
| JP | 2014-002049 A | 1/2014 |
| JP | 2015-166699 A | 9/2015 |

OTHER PUBLICATIONS

"Method optimization system triple capillary column GC", Shimadzu Corporation, online, on May 16, 2016, for search <URL: http://www.an.shimadzu.co.jp/gc/tcc-gc.htm>, 3 pgs.

* cited by examiner

GAS CHROMATOGRAPH

BACKGROUND

The present disclosure relates to a gas chromatograph (hereinafter referred to as "GC"). Examples of the gas chromatograph apparently include a GC—mass spectrometer having a mass spectrometer as a detector, regardless of the type of the detector.

A known GC introduces a sample vaporized in a sample injection port provided to the head of a column into the column by carrying the sample on the stream of a carrier gas and separates various components in the sample along the time axis during the travel of the sample through the column. The GC has a detector, provided to the outlet of the column, detecting the components separated and sequentially running out of the column and, based on the detected signal, creates a chromatogram indicating relation between the time when each component runs out of the column, which is the retention time, and signal intensity, which depends on the concentration of the component.

A GC usually conducts an isothermal analysis in which the temperature of a column oven accommodating the column is maintained at a constant temperature higher than the room temperature and conducts a non-isothermal analysis with the temperature of the column oven increased in accordance with a predetermined temperature increase program. In these manners, however, an increase in the column temperature with atmospheric air entering the column may cause deterioration of the column such as oxidation of a liquid stationary phase applied to the inner wall of the column (for example, see Japanese Unexamined Patent Publication No. 2013-44647). A conventional GC therefore does not immediately increase the temperature of a column oven even when receiving a command to start up the instrument from a halt state and start only gas pressure control or gas flow rate control to introduce a carrier gas into the column. In this process, gas in the column is replaced with a carrier gas such as helium and nitrogen. When a predetermined standby time (hereinafter referred to as a "start time") in starting up the instrument has passed from the start of feeding the carrier gas, the GC starts temperature control on the column oven and sets the inside of the column oven at a predetermined temperature.

Such a GC is also known that has a function (for example, "INJ maintenance" function of a GC of Shimadzu Corporation) of stopping temperature control on the column oven and the sample injection port and stopping pressure (or flow rate) control on a carrier gas while maintaining the detector at high temperatures, which is for replacing consumables such as a glass insert and a septum of the sample injection port during operation (during application of current) of the GC. This type of GC restarts temperature control on the column oven and the sample injection port and pressure (or flow rate) control on the carrier gas after replacement of consumables; however, problematically, atmospheric air is likely to enter the column in this process. The GC therefore first restarts pressure (or flow rate) control on the carrier gas, waits over a start time from the restart, and restarts temperature control on the column oven, as in starting up the instrument.

In such a conventional GC, the above start time is manually set by a user or set using a defined value such as five minutes and ten minutes preset in firmware of the instrument. If a user sets a start time, the user may estimate the time necessary to replace gas in the column from the gas flow rate calculated based on analytical conditions such as the type of carrier gas to be used and the column head pressure and determine the start time based on the estimated value. This calculation is, however, quite complicated and laborious. It is also frustrating to recalculate the necessary time and change setting of the start time whenever the analytical conditions are changed.

Furthermore, GCs increasingly have more complex system configurations. For example, Japanese Unexamined Patent Publication No. 2015-166699 describes a dielectric-barrier discharge ionization detector (BID) that is connected to the outlet of the column and sets the column outlet pressure at a gas pressure determined based on the settings of the detector instead of setting at atmospheric pressure. Japanese Unexamined Patent Publication No. 2010-203951 describes a GC having a detector connected to the outlet of the column with a flash element interposed. In the GCs described in Japanese Unexamined Patent Publication No. 2007-3190 and in "method optimization system triple capillary column GC" (Shimadzu Corporation, online, on May 16, 2016, for search <URL: http://www.an.shimadzu.co.jp/gc/tcc-gc.htm>), a plurality of analysis lines are juxtaposed. With these GCs, it is actually impracticable for users to set an appropriate start time based on the analytical conditions on each analysis, and quite a long start time including a sufficient extra time is therefore set instead of making users calculate the time necessary to replace gas in the column.

The instrument is therefore maintained in a standby state even in a right timing to increase the temperature of the column oven with the inside of the column filled with a carrier gas, which is a major problem that decreases the efficiency of a gas chromatographic analysis. The carrier gas needlessly keeps flowing into the column during the standby state, which increases the consumption of the carrier gas and accordingly increases the running cost for measurement.

SUMMARY

In view of the foregoing background, it is an object of the present disclosure to provide a GC, which may have a complex device configuration, capable of increasing the temperature of a column oven after residual gas in the column is adequately replaced by a carrier gas, for example, in starting up the GC, without causing much trouble on the user or without wasting time by waiting.

To overcome the above problems, a first aspect relating to a GC of the present disclosure includes a column, a column oven accommodating the column, a detector detecting a component from a sample having passed the column, a flow rate controller controlling the flow rate of a carrier gas supplied to the column, and a sample introduction unit provided to the head of the column and introducing the sample to the column on the stream of the carrier gas controlled by the flow rate controller. The GC includes: a) an information gathering unit configured to gather at least information relating to a column head pressure and a column outlet pressure, the length and the inner diameter of the column, the type of carrier gas, and the temperature of the column oven; b) a time calculation unit configured to calculate the time necessary to replace gas in the column with the carrier gas fed to the column, in an starting up operation of the GC or in a recovery operation of the GC, which is an operation of recovery from a state in which at least temperature control on the column oven is stopped or the column oven is maintained at a predetermined temperature with no carrier gas supplied from the flow rate controller to the column to a regular standby state to conduct an analysis, at a timing to start the starting up operation or to start the recovery operation or at any timing prior to the timing, based on information gathered by the information gathering unit; and c) an analysis control unit configured to, in the starting up operation of the GC or in the recovery operation of the GC, permit temperature control with an increase in the temperature to be conducted on the column oven after a time calculated by the time calculation unit or the time plus a predetermined extra time has passed from the start of supplying the carrier gas from the flow rate controller to the column.

To overcome the above problems, a second aspect relating to a GC of the present disclosure includes a column, a column oven accommodating the column, a detector detecting a component from a sample having passed the column, a flow rate controller controlling the flow rate of a carrier gas supplied to the column, and a sample introduction unit provided to the head of the column and introducing the sample to the column on the stream of the carrier gas controlled by the flow rate controller. The GC includes: a) an information gathering unit configured to gather at least information relating to a column outlet pressure, the length and the inner diameter of the column, the type of carrier gas, and the temperature of the column oven; b) a head pressure calculation unit configured to calculate a column head pressure at which such an average linear velocity of the carrier gas is achieved that allows the time necessary to replace gas in the column with the carrier gas fed to the column to fall below a target value, in a starting up operation of the GC or in a recovery operation of the GC, which is an operation of recovery from a state in which at least temperature control on the column oven is stopped or the column oven is maintained at a predetermined temperature with no carrier gas supplied from the flow rate controller to the column to a regular standby state to conduct an analysis, at a timing to start the starting up operation or to start the recovery operation or at any timing prior to the timing, based on information gathered by the information gathering unit; and c) an analysis control unit configured to, in the starting up operation of the GC or in the recovery operation of the GC, permit temperature control with an increase in the temperature to be conducted on the column oven after the target value or the target value plus a predetermined extra time has passed from the start of supplying the carrier gas from the flow rate controller to the column, under setting of the column head pressure calculated by the head pressure calculation unit.

To overcome the above problems, a third aspect relating to a GC of the present disclosure includes a column, a column oven accommodating the column, a detector detecting a component from a sample having passed the column, a flow rate controller controlling the flow rate of a carrier gas supplied to the column, and a sample introduction unit provided to the head of the column and introducing the sample to the column on the stream of the carrier gas controlled by the flow rate controller. The GC includes a) an information gathering unit configured to gather at least information relating to a column head pressure and a column outlet pressure, the length and the inner diameter of the column, and the type of carrier gas; b) a temperature detection unit configured to detect the temperature inside the column oven or the temperature around the column oven; c) an replacement information calculation unit configured to, in a starting up operation of the GC or in a recovery operation of the GC, which is an operation of recovery from a state in which at least temperature control on the column oven is stopped with no carrier gas supplied from the flow rate controller to the column, to a regular standby state to conduct an analysis, calculate the length of a part of the column in which gas in the column has been replaced by the carrier gas fed to the column, based on information gathered by the information gathering unit and a temperature repeatedly detected by the temperature detection unit over time, after the start of supplying the carrier gas from the flow rate controller to the column; and d) an analysis control unit configured to determine whether gas in the column has been adequately replaced, based on the length of the part of the column calculated by the replacement information calculation unit and permit temperature control with an increase in the temperature to be conducted on the column oven after determination that the gas has been adequately replaced.

In the present disclosure, the above-described "a recovery operation of the GC from the state in which at least temperature control on the column oven is stopped or the column oven is maintained at a predetermined temperature with no carrier gas supplied from the flow rate controller to the column to a regular standby state to conduct an analysis" is an operation conducted by, for example, the above "INJ maintenance" function or an equivalent function thereof.

A user using a GC usually sets analytical conditions such as the inner diameter and the length of a column to be used, the column head pressure and the column outlet pressure, the type of carrier gas, the temperature of a column oven (an isothermal program or a non-isothermal program with the temperature increased) and stores the conditions, as analytical conditions, in the instrument prior to the analysis. The above information gathering unit of the GC according to the present disclosure is therefore allowed to extract necessary information from the stored information. However, the column outlet pressure has variations depending on the type of detector to be used, and the pressure may correspond to atmospheric pressure in some detectors. With a detector such as the above BID in which another different gas is supplied to the detector cell, the column outlet pressure is subject to a value set for flow rate control on the different gas in the detector. Instead of using values set in the analytical conditions, values measured by a pressure sensor when gas is actually supplied based on the set values may be used for the column head pressure and the column outlet pressure.

In the GC of the first aspect of the present disclosure, for example, upon command to start a starting up operation or a recovery operation of the instrument from a user, the time calculation unit substitutes information gathered by the information gathering unit to a predetermined formula and calculates the average linear velocity of a carrier gas fed from the flow rate controller to the column. The time calculation unit further calculates a gas replacement necessary time necessary to replace gas in the column with the carrier gas based on the average linear velocity. The temperature of the column oven is assumed to be constant. More specifically, the column oven may be maintained at a constant temperature (a temperature not allowing residual gas to cause deterioration of the liquid stationary phase) or may be under no temperature control (with no current applied to the heater) until the gas in the column is replaced. In the latter case, for example, the temperature of the column oven may be considered to be equal to a temperature detected by a temperature sensor monitoring the temperature inside the column oven or a temperature sensor monitoring the temperature of a room where the GC is installed.

The analysis control unit starts measuring time using a timer from when the flow rate controller starts supplying carrier gas to the column, determines whether the time reaches the above gas replacement necessary time or the gas replacement necessary time plus a predetermined extra time, and after the time reaches, permits temperature control with an increase in the temperature to be conducted on the column oven. The column oven is therefore maintained at a temperature at least not allowing the residual gas in the column to cause deterioration of the liquid stationary phase until the residual gas is completely replaced by the carrier gas. Without much delay after the residual gas in the column is completely replaced by the carrier gas, the column oven is set at an analytical initial temperature.

If the time calculation unit calculates the gas replacement necessary time using the analytical conditions preliminarily set by a user, the time calculation unit may calculate the gas replacement necessary time at any appropriate timing prior to a command to start a starting operation or a recovery operation of the GC.

In the first aspect relating to the GC of the present disclosure, at least in use of a plurality of juxtaposed columns together for an analysis, it is preferable that the time calculation unit may calculate the time necessary to replace gas inside the column on each of the columns and that the analysis control unit may determine the timing to permit temperature control to be conducted on the column oven based on the longest time among the times calculated on respective columns.

Simultaneous use of a plurality of juxtaposed columns causes variations in the gas replacement necessary time depending on, for example, variations in the inner diameter and the length of the column, the column head pressure, and the column outlet pressure. For such simultaneous use of a plurality of juxtaposed columns, the preferable configuration described above allows the temperature of the column oven to be increased after residual gas in the column having the longest gas replacement necessary time is completely replaced by the carrier gas, thereby properly reducing deterioration of a liquid stationary phase of each column.

The first aspect relating to the GC of the present disclosure may further include an input setting unit used by a user to input and set a standby time, the time from the timing of starting supplying the carrier gas to the timing of starting temperature control on the column oven. The analysis control unit may select between the time calculated by the time calculation unit or the time plus a predetermined extra time and the standby time set by the input setting unit and determine the timing to permit temperature control to be conducted on the column oven based on the selected time.

In other words, a user can selectively determine the timing to permit temperature control to be conducted on the column oven by selecting a time automatically determined or a time set base on the intention of the user. This configuration is useful to replace residual gas in the column with carrier gas and is also useful, for example, to clean (remove contaminated substances) the inside of the column by continuously flowing the carrier gas for a much longer time than the automatically determined time.

The GC in the first aspect of the present disclosure calculates the average linear velocity of the carrier gas using a predetermined gas inlet pressure and a predetermined formula. Conversely, the GC in the second aspect has a predetermined target value for the gas replacement necessary time and adjusts the average linear velocity to achieve the target value. The head pressure calculation unit therefore calculates the gas inlet pressure that achieves the average linear velocity allowing the gas replacement necessary time to fall below the target value using a modified above predetermined formula. The analysis control unit sets the gas inlet pressure at the calculated value and permits temperature control to be conducted on the column oven after the target value for the gas replacement necessary time or the target value plus a predetermined extra time has passed from the start of supplying the carrier gas. With the structure of the first aspect, the standby time until gas replacement is changed with, for example, a change in the type of carrier gas. With the structure of the second aspect, the standby time until gas replacement remains the same even when, for example, the type of carrier gas is switched or the column is replaced.

In the GC of the first aspect of the present disclosure, the timing to permit temperature control to be conducted on the column oven is determined based on the gas replacement necessary time determined in starting up the instrument or before the start. In the GC of the third aspect of the present disclosure, the gas replacement necessary time is not predetermined. Instead, the replacement information calculation unit estimates the length of a part of the column where gas in the column has been replaced, using the average linear velocity of the carrier gas calculated from time to time in response to measured temperatures. The analysis control unit permits temperature control to be conducted on the column oven after the time when the residual gas is estimated to have been replaced by the carrier gas. This structure allows the temperature of the column oven to be increased after the residual gas in the column is properly replaced by the carrier gas, even when the temperature of the column oven is changed due to, for example, a drastic change in the environmental temperature. This structure further allows the temperature of the column oven to be increased without delay from completion of replacement of the residual gas in the column with the carrier gas.

The GC of the present disclosure is capable of increasing the temperature of a column oven to an analytical initial temperature in a starting up operation or in a recovery operation of the GC, without much delay after residual gas in the column is adequately replaced by a carrier gas or without having a user perform complicated calculations which may be actually impossible for the user because of quite a complex device configuration. This structure can properly prevent deterioration of the column, which results from an increase in the temperature of the column with atmospheric air or the like remaining in the column. Furthermore, the structure can reduce a wasted time caused by unnecessarily waiting without increasing the temperature of the column after completion of replacement of residual gas in the column with the carrier gas, and thus can improve the efficiency of analysis. In addition, the structure can reduce unnecessary consumption of the carrier gas.

DETAILED DESCRIPTION

First Embodiment

Figure 1:
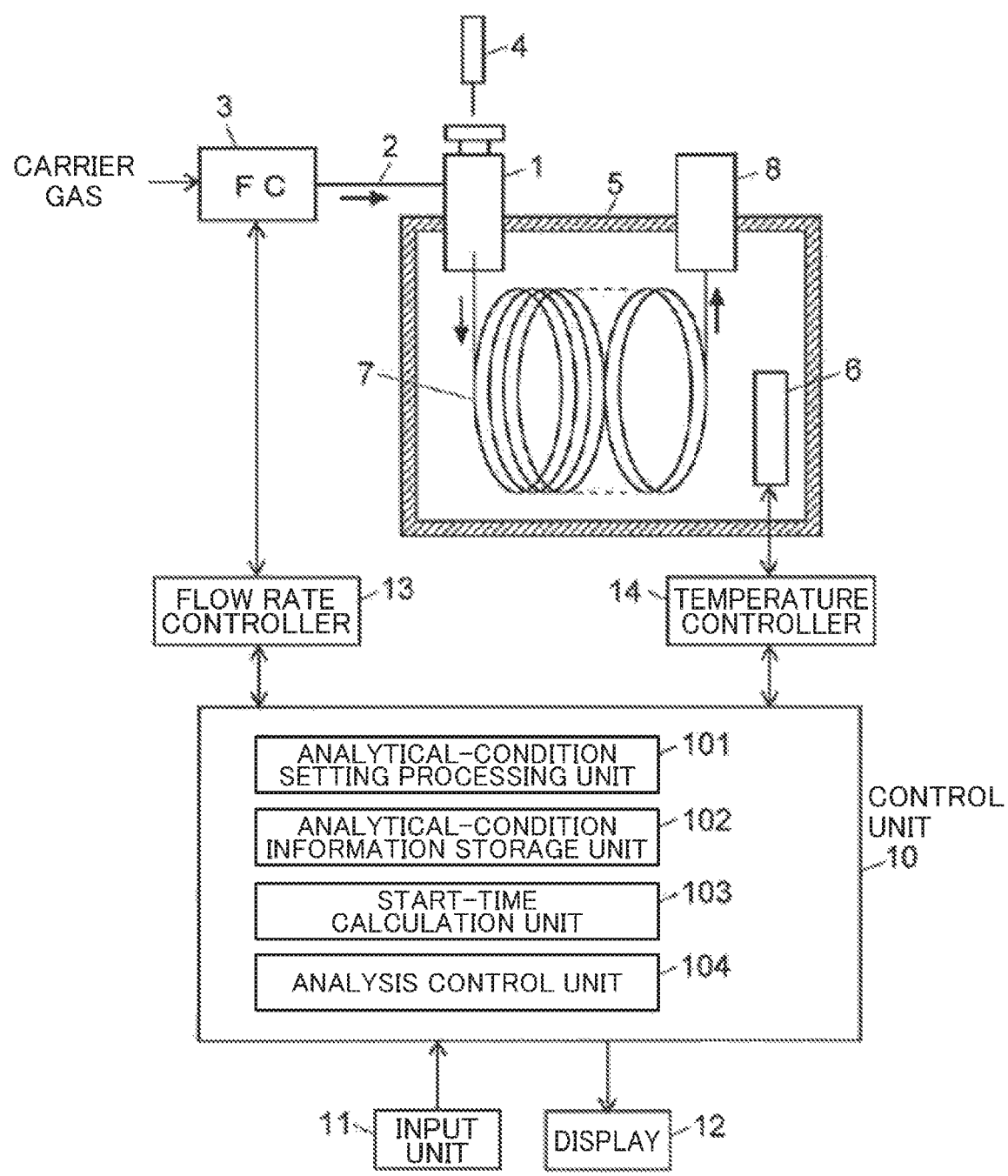
FIG. 1 is a schematic view of a configuration of a GC of a first embodiment in the present disclosure.

A GC of a first embodiment of the present disclosure will now be described with reference to the accompanying drawings. FIG. 1 is a schematic view of a configuration of a GC of the first embodiment. The GC includes a column 7 accommodated in a column oven 5, a sample injection port 1 provided to a head end of the column 7, a detector 8 provided to an outlet end of the column 7, a carrier gas flow path 2 having a flow controller (FC) 3 disposed in the middle thereof and supplying a carrier gas to the sample injection port 1, an injector 4 injecting a sample into the sample injection port 1, a heater 6 provided inside the column oven 5, a flow rate controller 13 controlling the flow controller 3, a temperature controller 14 controlling temperature adjustment by the heater 6, a control unit 10 controlling each unit, an input unit 11 used by a user to input analytical conditions and others, and a display 12 used for confirming information input by the user, displaying analytical results, and others. In FIG. 1, illustration of components, such as a signal processing unit processing a signal detected by the detector 8, not relating to characteristic operation of the GC of the embodiment is partially omitted.

Any type of detector 8 is applicable, and detectors usually used for gas chromatography, such as a flame ionization detector, a flame photometric detector, a flame thermionic detector, an electron capture detector, a thermal conductivity detector, a dielectric barrier discharge ionization detector, and a mass spectrometer, can be selectively used. A sample introduction unit for introducing a sample into the column 7 may be implemented by a headspace sampler and the like instead of the sample injection port 1.

As with many of recent GCs, at least a part of functions of the control unit 10 can be implemented by executing dedicated control software, pre-installed to a personal computer, on the computer.

Figure 2:
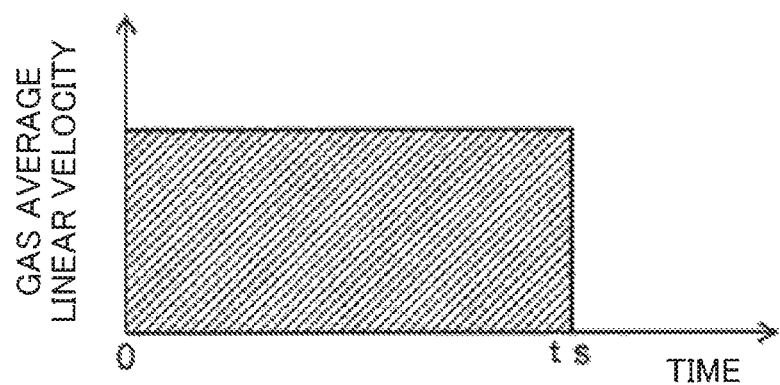
FIG. 2 is a graph illustrating variations with time of the average linear velocity of a carrier gas in starting up the GC in the first embodiment.
Figure 3:
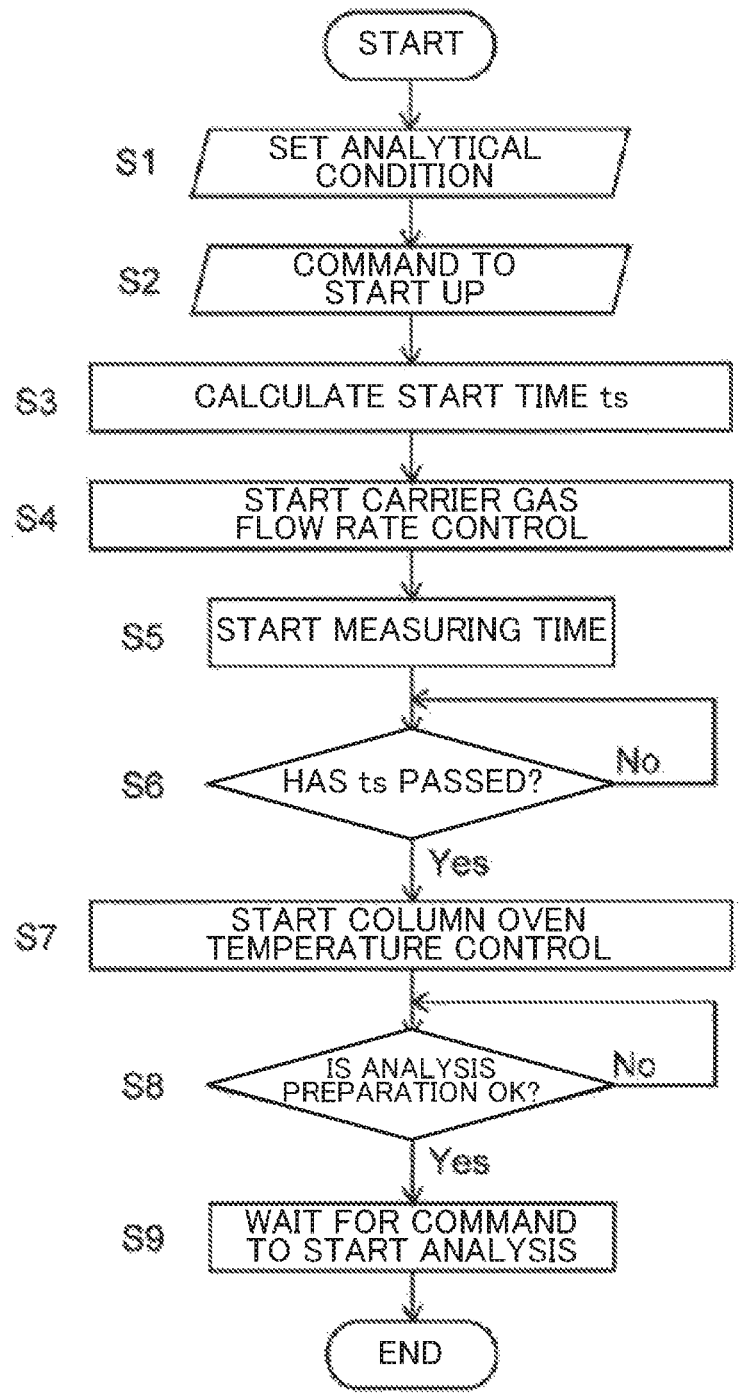
FIG. 3 is a control flowchart in starting up the GC of the first embodiment.

Characteristic control operation in starting up the GC of this embodiment will be described with reference to FIG. 2 and FIG. 3. FIG. 3 is a control flowchart in starting up the GC, and FIG. 2 is a graph illustrating variations with time of the average linear velocity of a carrier gas in starting up the GC. The state before "starting up the GC" is a state in which the control unit 10 is allowed to operate, for example, for later-described setting of analytical conditions with the main power of the GC left on whereas an analysis unit body stops its operation.

A user sets various analytical conditions with the input unit 11 (Step S1). More specifically, various analytical conditions are set with an analytical-condition setting processing unit 101 displaying a predetermined analytical-condition setting screen on a screen of the display 12 and with the user performing operations of selection, input of a numerical value, and others as appropriate through the input unit 11. The analytical conditions include the inner diameter and the length of the column 7 to be used, the type of carrier gas to be used, the column head pressure, the column outlet pressure, and conditions relating to the temperature (selection between an isothermal analysis and a non-isothermal (with the temperature increased) analysis and a temperature program) of the column oven. The inner diameter of the column 7 is preferably an actual inner diameter calculated by subtracting the film thickness of a liquid stationary phase applied to the inner wall of the column 7 from the inner diameter of the column 7. The analytical-condition setting processing unit 101 stores the input analytical conditions in an analytical-condition information storage unit 102. In use of analytical conditions already stored in the analytical-condition information storage unit 102, the analytical-condition setting processing unit 101 only needs to instruct use of the stored analytical conditions.

The column outlet pressure depends on the type of the detector 8 to be used. Depending on the structure of the detector, the column outlet pressure may correspond, for example, to atmospheric pressure or to supply pressure of a gas (for example, make-up gas and plasma gas) supplied to a detector cell of the detector. Instead of including the column outlet pressure, the analytical conditions may include the type of the detector 8 such that the column outlet pressure is automatically set at atmospheric pressure, at supply pressure of a gas supplied to a detector cell of the detector, and others depending on the type of the detector 8. In use of a mass spectrometer for the detector 8, the column 7 has a vacuum atmosphere at its outlet end. In this case, the column outlet pressure may be set at predetermined gas pressure in a vacuum atmosphere or at a value measured by a pressure sensor detecting the gas pressure in a vacuum atmosphere as described later.

When the user inputs a command to start up the GC with the input unit 11 (Step S2), a start-time calculation unit 103 receiving the command calculates a start time is in the following manner (Step S3). An average linear velocity U of a carrier gas traveling in a column of a GC is generally given by the following formula (1).

$$U=0.234375\times(K/\mu)\times[\{(Pin+Patm)^2-(Pout+Patm)^2\}^2/\{(Pin+Patm)^3-(Pout+Patm)^3\}] \quad (1),$$

where U: the average linear velocity [cm/s], K: $(D\times100)^2/L$, D: the inner diameter of the column [mm], L: the length of the column [m], $\mu$ the viscosity of a carrier gas [$10^{-6}$ Pa·s], Pin: column head pressure [kPa], Pout: column outlet pressure [kPa], Patm: atmospheric pressure [kPa]. The viscosity $\mu$ of the carrier gas is determined based on the type and the temperature (the temperature of the column oven) of the carrier gas.

As described above, the analytical-condition information storage unit 102 stores analytical conditions including the inner diameter D and the length L of the column 7, the column head pressure Pin, the column outlet pressure Pout, and the type of carrier gas. The atmospheric pressure Patm usually uses the standard atmospheric pressure 101.325 [kPa] or may use a measured value of atmospheric pressure detected by an attached atmospheric pressure sensor. When no temperature control is conducted on the column oven with no current supplied to the heater 6, the temperature of the column oven can be usually determined to be constant at a usual room temperature (for example, about 20 to 25° C.) or at an initial temperature detected by the temperature sensor (not illustrated) attached to the heater 6 at least in a time range (a few minutes to over ten minutes at longest) taken to fill the column 7 with a carrier gas. The start-time calculation unit 103 reads out necessary information from the analytical-condition information storage unit 102, gathers necessary information from an attached sensor such as a temperature sensor as necessary, and calculates the average linear velocity U by substituting the obtained values to the formula (1). This calculation is based on the assumption that the analytical conditions including the temperature of the column oven have no changes, and the average linear velocity is therefore constant as illustrated in FIG. 2.

The start-time calculation unit 103 calculates a gas replacement necessary time t1 necessary to completely replace residual gas in the column 7 with the carrier gas based on the above average linear velocity U and the column length L. The gas replacement necessary time t1 may be directly used for a start time ts. It is, however, more preferable to allow an appropriate margin, considering errors in calculations, variations in parameter values of the analytical conditions, and others. For example, the start time ts may be given by 1.05×t1 with a margin of five percent.

In parallel with the calculation of the start time ts, an analysis control unit 104 controls the flow rate of the carrier gas in the flow controller 3 using the flow rate controller 13 so as to set the gas inlet pressure at a set target value and starts feeding the carrier gas at a constant flow rate (Step S4). Upon start of feeding the carrier gas, the analysis control unit 104 starts measuring the time using an inner timer (Step S5). The analysis control unit 104 repeatedly determines whether the time measured by the inner timer reaches the start time ts (Step S6).

The carrier gas supplied to the column 7 through the sample injection port 1 pushes out residual gas in the column 7 and gradually replaces the gas in the column 7. As illustrated in FIG. 2, the average linear velocity of the carrier gas is maintained constant, which accordingly makes the velocity at which the residual gas is replaced by the carrier gas constant. When the time measured by the inner timer reaches the start time ts, the analysis control unit 104 supplies current for heating to the heater 6 using the temperature controller 14 and starts temperature control on the column oven 5 in accordance with the set conditions of an isothermal analysis or non-isothermal (with the temperature increased) analysis (Step S7).

When the time measured by the inner timer reaches the start time ts, the gas inside the column 7 has been completely replaced by the carrier gas. This process can reduce deterioration of the liquid stationary phase of the column 7 caused by oxygen remaining in the column 7, even if the temperature of the column oven 5 is rapidly increased at Step S7. When the temperature of the column oven 5 reaches, for example, a predetermined initial temperature, the analysis control unit 104 determines that preparation for analysis is completed (Yes at Step S8) and transitions to a standby state for receiving a command of actual analysis start (Step S9). The analysis control unit 104 immediately starts a gas chromatographic analysis if automatic start of a gas chromatographic analysis is designated. As described above, the GC of this embodiment is capable of increasing the temperature of the column oven 5 to an analytical initial temperature without delay after residual gas in the column 7 is replaced by the carrier gas.

In the above embodiment, current is not supplied to the heater 6 until residual gas in the column 7 is replaced by the carrier gas. At low temperatures at which no oxidation of the liquid stationary phase is caused by air (oxygen) remaining in the column 7, however, temperature control on the column oven 5 may be conducted in this period. For example, the column oven 5 may be controlled at a constant temperature of 50° C. upon starting up of the instrument, and the start time ts may be calculated based on the temperature of the column oven defined as 50° C. Such temperature control on the column oven 5 allows the actual average linear velocity of the carrier gas to be maintained substantially constant, which reduces a difference between the calculated start time and the start time actually necessary to be taken.

The above-described control in this embodiment is conducted in starting up the instrument. This manner of control is, such as the above-described "INJ maintenance" function, also applicable to control in a recovery operation of the instrument from a state in which supply of the carrier gas to the column 7 and temperature control on the sample injection port 1 and the column oven 5 are stopped with other units kept in operation such as the detector 8 receiving temperature control, to a state allowing analysis.

In the above embodiment, the average linear velocity is basically calculated using the column head pressure and the column outlet pressure set in the analytical conditions. In another manner, a pressure value measured by the attached pressure sensor may be used for the calculation. In some configurations, the detector 8 is not directly connected to the outlet end of the column 7 and connected with a back flash element interposed. In this case, the column outlet pressure may be set at control pressure of a flow controller connected with the back flash element. The GC illustrated in FIG. 1 has one analysis line including the sample injection port 1, the column 7, and the detector 8. Some GCs have a plurality of juxtaposed analysis lines. In such a GC, the start time ts is determined in the later-described manner.

In the above embodiment, the timing to start temperature control on the column oven 5 is automatically determined based on the start time ts. Depending on the circumstances, such a manner of temperature control is sometimes desired that starts temperature control on the column oven 5 after continuously flowing the carrier gas into the column 7 for a longer time. For example, a user may want to remove contaminants attached to the inside of the column 7 using the flow of the carrier gas. The GC of this embodiment therefore may be capable of selecting between a start time preliminarily input by a user and a start time automatically calculated as described above and determining the timing to start temperature control on the column oven 5 using the selected start time.

Instead of preliminarily selecting the start time, the GC may calculate the start time is at Step S3 and display the calculated value on the screen of the display 12. For the displayed start time, the user may input another start time to be actually used for control or may modify the displayed start time as necessary. In still another configuration, a remaining time before start of temperature control on the column oven 5 may be displayed on the screen of the display 12, and the user may perform a predetermined operation to extend the time by a necessary amount (one minute, three minutes, and the like) before the remaining time runs out.

Second Embodiment

Figure 4:
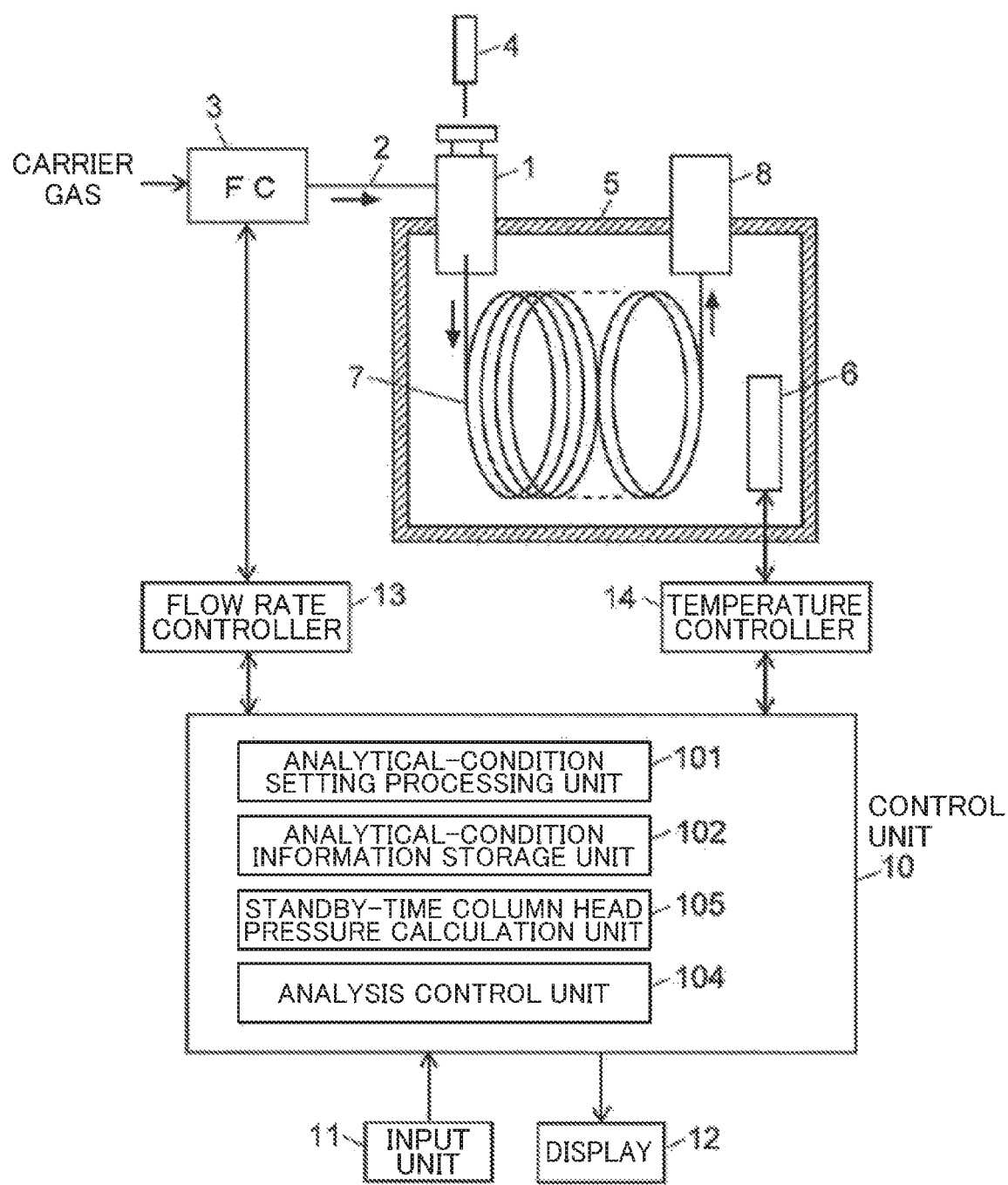
FIG. 4 is a schematic view of a configuration of a GC of a second embodiment in the present disclosure.
Figure 5:
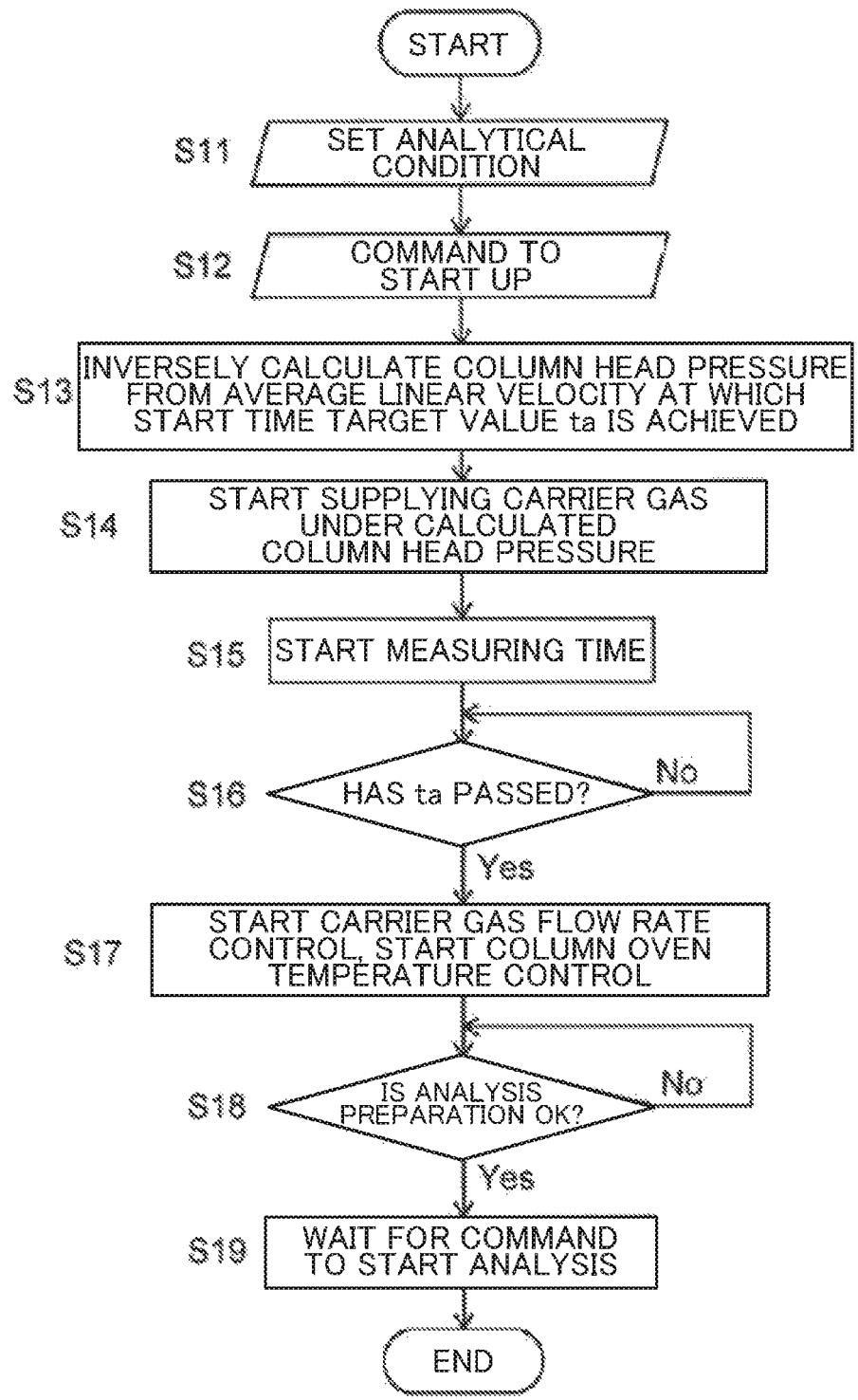
FIG. 5 is a control flowchart in starting up the GC of the second embodiment.

A GC of a second embodiment in the present disclosure will now be described with reference to the accompanying drawings. FIG. 4 is a schematic view of a configuration of the GC of the second embodiment, and FIG. 5 is a control flowchart in starting up the GC. In FIG. 4, like components described in FIG. 1 are indicated by like reference numerals. Steps S11, S12, S18, and S19 in FIG. 5 are steps to conduct the same processing at Steps S1, S2, S8, and S9, respectively, in FIG. 3.

As illustrated in FIG. 4, the GC of the second embodiment includes a standby-time column head pressure calculation unit 105 instead of the start-time calculation unit 103 included in the GC of the first embodiment. Characteristic control operation in starting up the GC of the second embodiment will be described with reference to FIG. 5. Upon command of a user to start up the instrument, the standby-time column head pressure calculation unit 105 calculates a column head pressure (which is different from the column head pressure set by a user and will therefore be referred to as a "standby-time column head pressure") that achieves an average linear velocity allowing a start time (a necessary time for gas replacement or the necessary time plus a margin) calculated based on the average linear velocity of the carrier gas given by the formula (1) to fall below a preset target value ta (Step S13). Apparently, this method is the inverse calculation of the start time is in the GC of the first embodiment.

When the standby-time column head pressure is calculated, the analysis control unit 104 controls the flow rate of the carrier gas in the flow controller 3 using the flow rate controller 13 to adjust the actual column head pressure not to the column head pressure set by the user but to the standby-time column head pressure, and starts feeding the carrier gas at a constant flow rate (Step S14). The analysis control unit 104 starts measuring time using the inner timer and repeatedly determines whether the time measured by the inner timer reaches the start time target value ta (Step S16). When the time reaches the target value ta, the analysis control unit 104 changes the target value to a value allowing the actual column head pressure to be consistent with the column head pressure set by the user and controls the flow rate of the carrier gas in the flow controller 3 using the flow rate controller 13. The analysis control unit 104 supplies current for heating to the heater 6 using the temperature controller 14 and starts temperature control on the column oven 5 in accordance with the set conditions of an isothermal analysis or a non-isothermal (with the temperature increased) analysis (Step S17).

The GC in the second embodiment maintains the same start time for any change in analytical conditions other than the column head pressure, for example, the type of carrier gas. This configuration causes no variations in the standby time before start of temperature control, which is convenient to the user.

Third Embodiment

Figure 6:
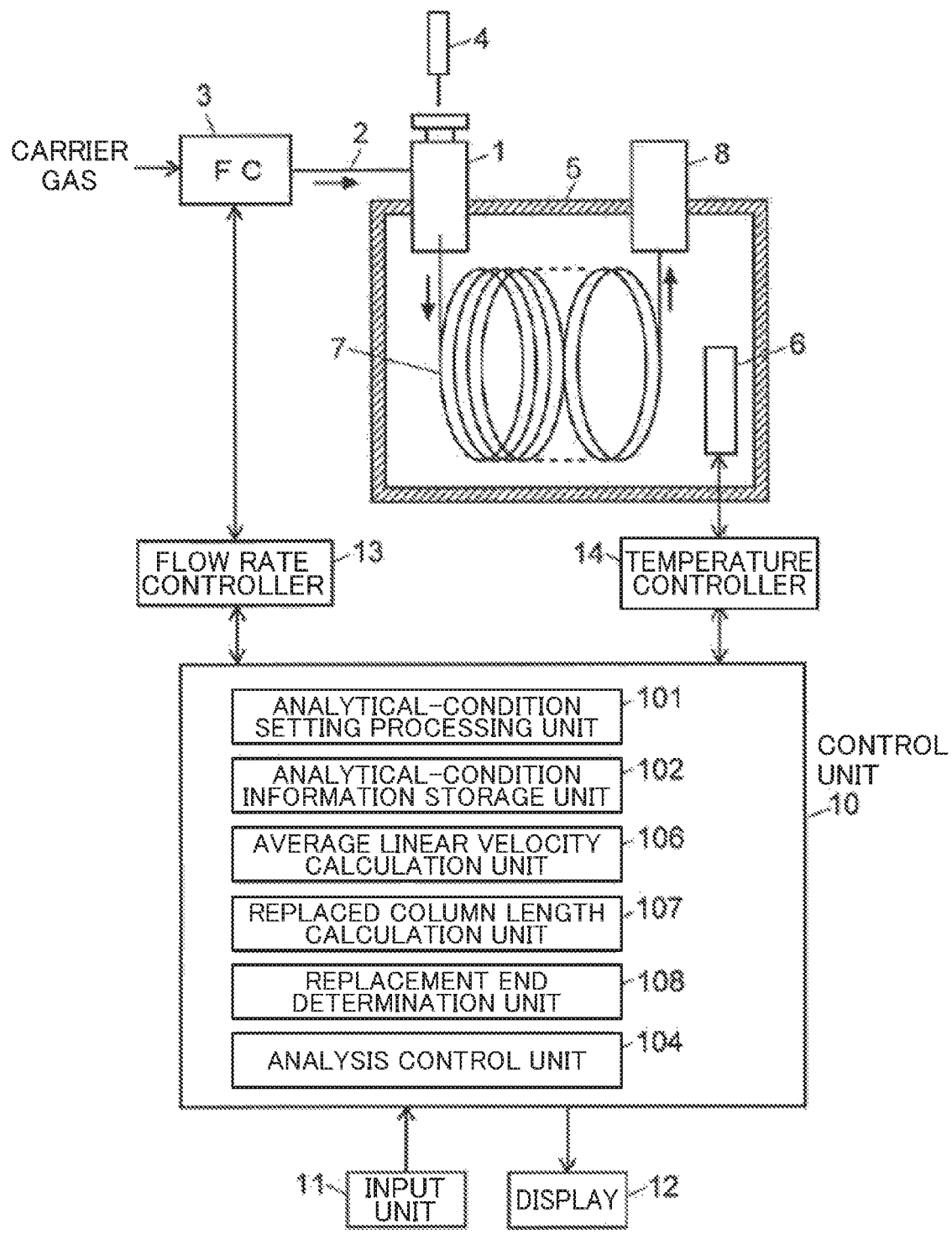
FIG. 6 is a schematic view of a configuration of a GC of a third embodiment in the present disclosure.
Figure 7:
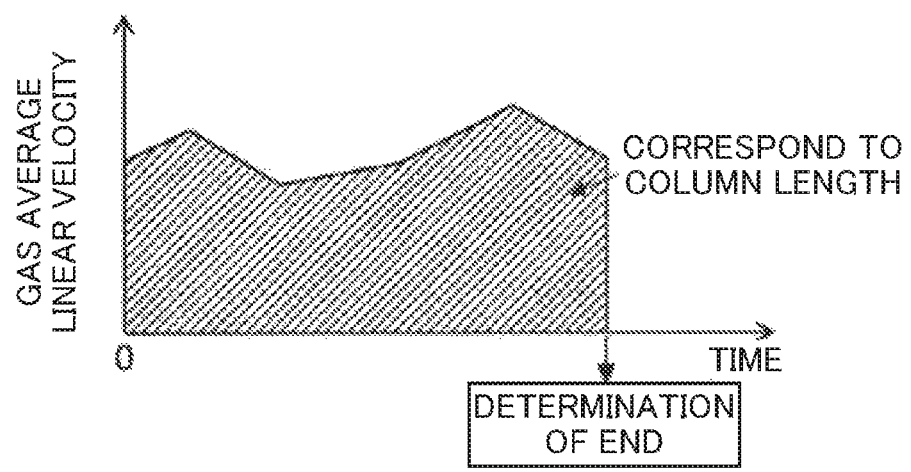
FIG. 7 is a graph illustrating an example of variations with time of the average linear velocity of a carrier gas in starting up the GC in the third embodiment.
Figure 8:
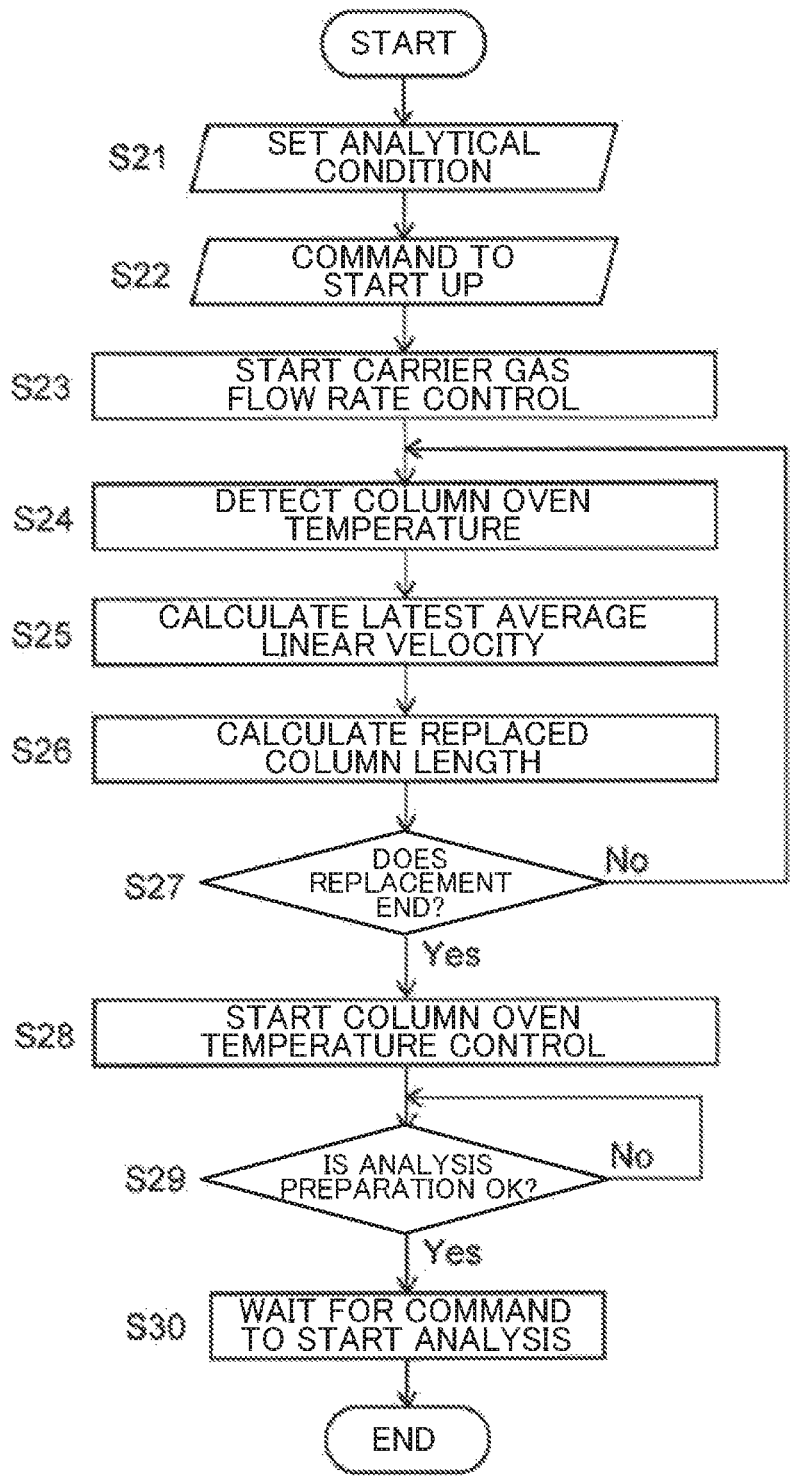
FIG. 8 is a control flowchart in starting up the GC of the third embodiment.

A GC of a third embodiment of the present disclosure will now be described with reference to the accompanying drawings. FIG. 6 is a schematic view of a configuration of the GC of the third embodiment, FIG. 7 is a graph illustrating an example of variations with time of the average linear velocity of a carrier gas in starting up the GC, and FIG. 8 is a control flowchart in starting up the GC. In FIG. 6, like components described in FIG. 1 are indicated by like reference numerals. Steps S21, S22, S23, S29, and S30 in FIG. 8 are steps to conduct the same processing of Steps S1, S2, S4, S8, and S9, respectively, in FIG. 3.

The GC of the third embodiment is assumed to conduct no temperature control on the column oven 5 until gas in the column 7 is replaced by a carrier gas (temperature control can be conducted on the column oven 5, if so, however, the needs to employ this GC of the third embodiment decrease). Without temperature control on the column oven 5, the temperature in the column oven 5 is affected by the environmental temperature (the room temperature) of the place where the GC is installed. The temperature in the column oven 5 may be changed with a change in the environmental temperature. A change in the temperature in the column oven 5 during feeding of the carrier gas to replace the gas in the column 7 changes the average linear velocity of the carrier gas, which may cause a difference in the start time ts calculated based upon a constant average linear velocity of the carrier gas.

However, the environmental temperature is less likely to change drastically within ten minutes or so, and the difference in the above start time ts caused by the change is actually not so serious. The configuration of the third embodiment therefore may be employed by a user who wants to properly replace gas in the column 7 without wasting time by waiting as much as possible. As illustrated in FIG. 6, the GC of the third embodiment includes an average linear velocity calculation unit 106, a replaced column length calculation unit 107, and a replacement end determination unit 108, instead of the start-time calculation unit 103 of the GC in the first embodiment.

Characteristic control operation in starting up the GC of the third embodiment will be described with reference to FIG. 7 and FIG. 8. Upon command of a user to start up the instrument, the analysis control unit 104 controls the flow rate of a carrier gas in the flow controller 3 using the flow rate controller 13 to adjust the gas inlet pressure to a set target value and starts feeding the carrier gas at a constant flow rate (Step S23). The average linear velocity calculation unit 106 detects the latest temperature using a temperature sensor (not illustrated) for detecting the temperature in the column oven 5 (Step S24), and calculates the latest average linear velocity U by using the formula (1) and the detected temperature and information stored in the analytical-condition information storage unit 102, specifically, information other than the temperature of the column oven such as the column head pressure, the column outlet pressure, the inner diameter and the length of the column 7, and the type of carrier gas (Step S25). Variations in the temperature of the column oven cause variations in the viscosity $\mu$ in the formula (1), which changes the average linear velocity U.

The replaced column length calculation unit 107 calculates a column length La in which gas in the column 7 has been replaced by the carrier gas, of the entire length L of the column 7 using the calculated latest average linear velocity U and the elapsed time from the start of feeding the carrier gas (Step S26). The replacement end determination unit 108 determines whether the calculated column length La exceeds the entire length of the column 7 to determine whether replacement of gas inside the column 7 is completed (Step S27). If replacement of gas is determined not to be completed, the process returns to Step S24 from Step S27, and processing at Step S24 to S27 is repeated.

Changes with time in the temperature in the column oven 5 change the average linear velocity of the carrier gas, for example, as illustrated in FIG. 7. The column length La in which gas in the column 7 has been replaced by the carrier gas corresponds to the area of the shaded part in FIG. 7, and the area is therefore actually calculated at Step S26. When replacement of gas in the column 7 is determined to be completed at Step S27, the analysis control unit 104 has the temperature controller 14 supply current for heating to the heater 6 and starts temperature control on the column oven 5 in accordance with the set conditions of an isothermal or a non-isothermal (with the temperature increased) analysis (Step S28). As with the above embodiments, at Step S27, replacement may be determined to be completed when a predetermined extra time as a margin has passed from the timing when the calculated column length La is determined to exceed the entire length of the column 7. The same result can be obtained by comparing the column length La in which gas in the column 7 has been replaced with the entire length of the column 7 defined longer with some extra length as a margin.

The GC of the third embodiment monitors an actual temperature of the column oven 5 and based on calculation using the temperature, calculates the length of a part in which gas in the column 7 has been replaced by the carrier gas, of the column 7, and permits an increase in the temperature of the column oven 5 at the timing when the calculated length exceeds the actual entire length of the column 7 or at a slightly delayed timing therefrom. With this structure, the start time cannot be determined in starting up the GC or in starting a recovery operation of the GC, which may cause inconvenience because when the start time ends is unknown. On the other hand, this structure is advantageous in that, without conducting temperature control on the column oven 5, a user can increase the temperature of the column oven 5 without wasting much time by waiting after completion of replacement of the gas in the column 7 with the carrier gas.

Figure 9:
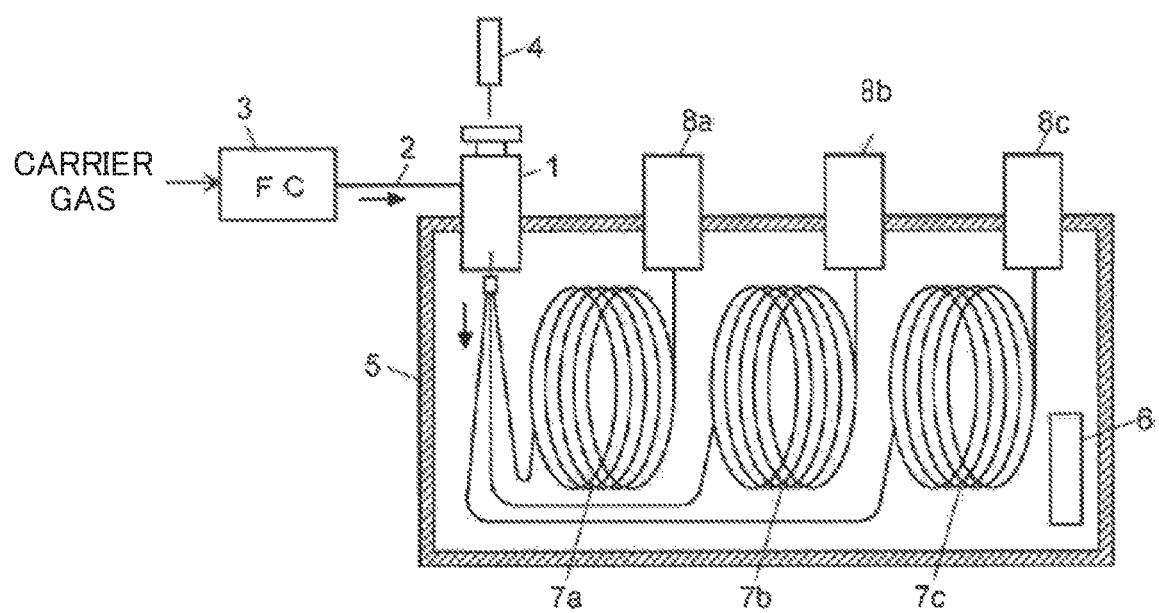
FIG. 9 is an exemplary configuration of a GC in which a sample injection port is shared by a plurality of columns and detectors.

Each of the GCs described in the above embodiments has an analysis line composed of a combination of the sample injection port 1, the column 7, and the detector 8. Some GCs have a plurality of juxtaposed analysis lines. FIG. 9 is an exemplary configuration of such a GC. The GC has a sample injection port 1 shared by a plurality of combinations of columns 7a to 7c and detectors 8a to 8c (see above "method optimization system triple capillary column GC", Shimadzu Corporation). In this configuration, a carrier gas supplied to the sample injection port 1 is divided to flow into three columns 7a to 7c. The GC therefore has respective different start times based on the average linear velocities of the carrier gas traveling in the columns 7a to 7c and the lengths of the columns 7a to 7c. When the configuration of FIG. 9 is adapted to the GC in the first embodiment, the start time may be calculated on each of the columns 7a to 7c, and the timing to start temperature control on the column oven 5 may be determined using the longest start time.

Changes, for example, in the column head pressure do not affect the relative relation in the length of a start time between a plurality of columns. When the configuration of FIG. 9 is adapted to the GC in the second embodiment, respective start times are temporarily calculated for the columns 7a to 7c to find a column having the longest start time. The standby-time column head pressure may be determined such that the start time of the column falls below the target value ta. Likewise, when the configuration of FIG. 9 is adapted to the GC in the third embodiment, respective start times are temporarily calculated for the columns 7a to 7c to find a column having the longest start time. The timing of an end of gas replacement may be exclusively determined on the column, using the procedure illustrated in FIG. 8.

The GC illustrated in FIG. 9 has a sample injection port shared by a plurality of columns. In another GC that has separate sample injection ports provided for respective columns, based on knowledge of combinations of a sample injection port, a column, and a detector to be used together, a user can calculate start times for respective combinations. The user adds each combination of a sample injection port, a column, and a detector to be used together, to the analytical conditions. When a plurality of combinations are designated, as described above, the user may find a combination having the longest start time and determine the timing to start temperature control on the column oven 5 using the longest start time.

Figure 10:
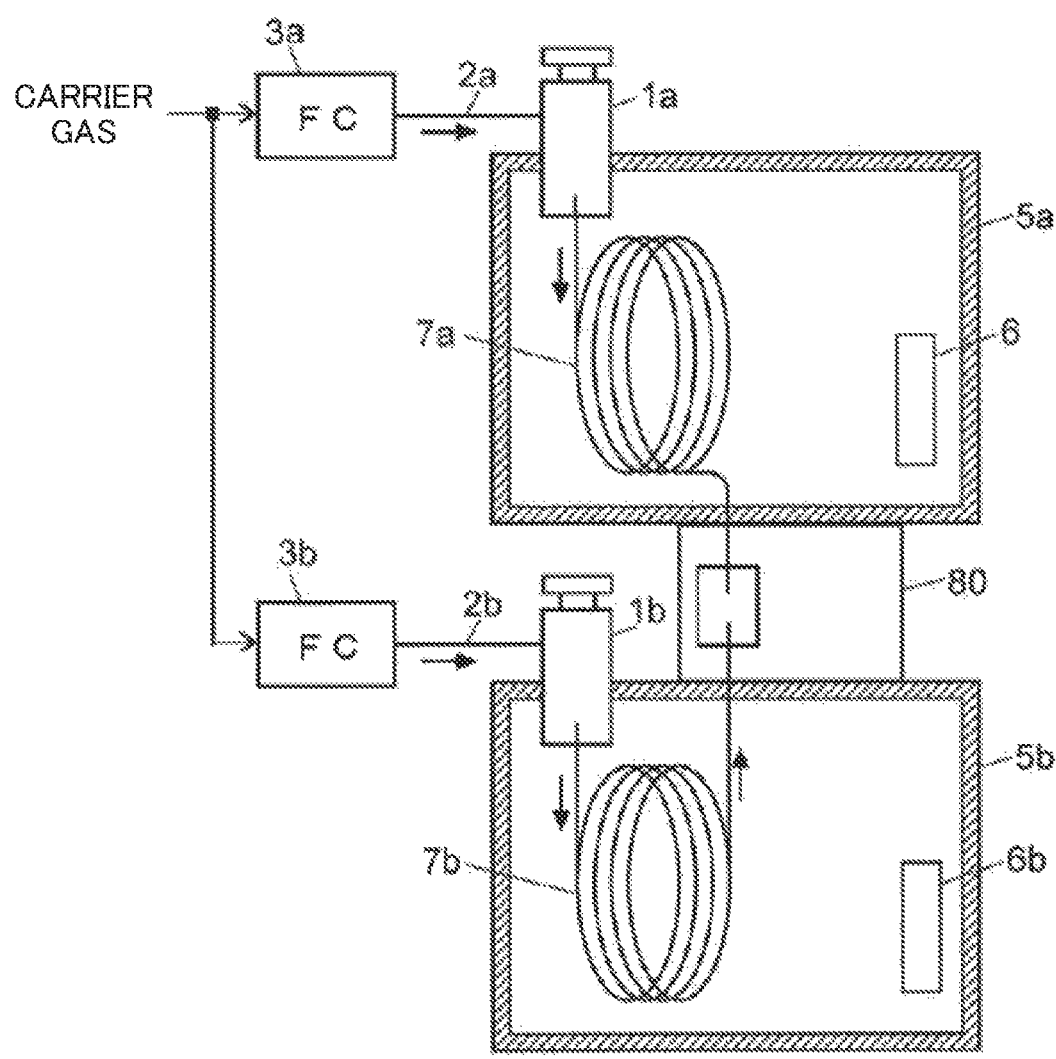
FIG. 10 is an exemplary configuration of a GC in which a detector is shared by a plurality of sample injection ports and columns.

FIG. 10 illustrates an example of a GC having a shared detector 80, which is implemented as a mass spectrometer, and a plurality of combinations including sample injection ports 1a and 1b (and flow controllers 3a and 3b) and columns 7a and 7b, respectively (see Japanese Unexamined Patent Publication No. 2007-3190). In this configuration, the flow controllers 3a and 3b are separately provided for the columns 7a and 7b, respectively. The two columns 7a and 7b may be used at the same time, or either one of the columns may be selectively used. The column 7a or 7b planned to be used is preliminarily added to the analytical conditions. When one of the columns 7a and 7b is used according to the conditions, the user may calculate a start time corresponding to the column 7a or 7b planned to be used. In use of two (or more) columns 7a and 7b at the same time, the user may calculate respective start times for the columns 7a and 7b and determine the timing to start temperature control on the column oven 5 based on the longest start time.

The above embodiments are only examples of the present disclosure and thus can be modified, changed, and added as appropriate within the scope of the present disclosure. The accompanying claims obviously include such equivalents of the present disclosure.

What is claimed is:

1. A gas chromatograph comprising:
a column, a column oven accommodating the column, a detector detecting a component from a sample having passed the column, a flow rate controller controlling a flow rate of a carrier gas supplied to the column, and a sample introduction unit provided to a head of the column and introducing the sample to the column on a stream of the carrier gas controlled by the flow rate controller,
a) an information gathering unit configured to gather at least information relating to a column head pressure and a column outlet pressure, a length and an inner diameter of the column, a type of the carrier gas, and a temperature of the column oven;
b) a time calculation unit configured to calculate a time necessary to replace gas in the column with the carrier gas fed to the column, in an starting up operation of the gas chromatograph or in a recovery operation of the gas chromatograph, which is an operation of recovery from a state in which at least temperature control on the column oven is stopped or the column oven is maintained at a predetermined temperature with no carrier gas supplied from the flow rate controller to the column to a regular standby state to conduct an analysis, at a timing to start the starting up operation or to start the recovery operation or at any timing prior to the timing, based on information gathered by the information gathering unit; and
c) an analysis control unit configured to, in the starting up operation of the gas chromatograph or in the recovery operation of the gas chromatograph, permit temperature control with an increase in a temperature to be conducted on the column oven after a time calculated by the time calculation unit or the time plus a predetermined extra time has passed from a start of supplying the carrier gas from the flow rate controller to the column.

2. The gas chromatograph of claim 1, wherein at least in use of a plurality of juxtaposed columns together for an analysis, the time calculation unit calculates a time necessary to replace gas in the column on each of the columns, and the analysis control unit determines a timing to permit temperature control to be conducted on the column oven based on a longest time among the times of respective columns.

3. The gas chromatograph of claim 1, further comprising:
an input setting unit configured to be used by a user to input and set a standby time from a timing to start supplying carrier gas to a timing to start temperature control on the column oven,
wherein the analysis control unit selects between a time calculated by the time calculation unit or the time plus a predetermined extra time and the standby time set using the input setting unit and determines a timing to permit temperature control to be conducted on the column oven based on the selected time.

4. A gas chromatograph including a column, a column oven accommodating the column, a detector detecting a component from a sample having passed the column, a flow rate controller controlling a flow rate of a carrier gas supplied to the column, and a sample introduction unit provided to a head of the column and introducing the sample to the column on a stream of the carrier gas controlled by the flow rate controller, the gas chromatograph comprising:
a) an information gathering unit configured to gather at least information relating to a column outlet pressure, a length and an inner diameter of the column, a type of the carrier gas, and a temperature of the column oven;
b) a head pressure calculation unit configured to calculate a column head pressure at which such an average linear velocity of the carrier gas is achieved that allows a time necessary to replace gas in the column with the carrier gas fed to the column to fall below a target value, in a starting operation of the gas chromatograph or in a recovery operation of the gas chromatograph, which is an operation of recovery from a state in which at least temperature control on the column oven is stopped or the column oven is maintained at a predetermined temperature with no carrier gas supplied from the flow rate controller to the column to a regular standby state to conduct an analysis, at a timing to start the starting operation or to start the recovery operation or at any timing prior to the timing, based on information gathered by the information gathering unit; and
c) an analysis control unit configured to, in the starting operation of the gas chromatograph or in the recovery operation of the gas chromatograph, permit temperature control with an increase in a temperature to be conducted on the column oven after the target value or the target value plus a predetermined extra time has passed from a start of supplying the carrier gas from the flow rate controller to the column under setting of the column head pressure calculated by the head pressure calculation unit.

5. A gas chromatograph comprising:
a column, a column oven accommodating the column, a detector detecting a component from a sample having passed the column, a flow rate controller controlling a flow rate of a carrier gas supplied to the column, and a sample introduction unit provided to a head of the column and introducing the sample to the column on a stream of the carrier gas controlled by the flow rate controller,
a) an information gathering unit configured to gather at least information relating to a column head pressure and a column outlet pressure, a length and an inner diameter of the column, and a type of the carrier gas;
b) a temperature detection unit configured to detect a temperature inside the column oven or a temperature around the column oven;
c) an replacement information calculation unit configured to, in a starting up operation of the gas chromatograph or in a recovery operation of the gas chromatograph, which is an operation of recovery from a state in which at least temperature control on the column oven is stopped with no carrier gas supplied from the flow rate controller to the column, to a regular standby state to conduct an analysis, calculate a length of a part of the column in which gas in the column has been replaced by the carrier gas fed to the column based on information gathered by the information gathering unit and a temperature repeatedly detected by the temperature detection unit over time, after a start of supplying the carrier gas from the flow rate controller to the column; and
d) an analysis control unit configured to determine whether gas in the column has been adequately replaced, based on a length of the part of the column calculated by the replacement information calculation unit and permit temperature control with an increase in a temperature to be conducted on the column oven after determination that the gas has been adequately replaced.

6. The gas chromatograph of claim 2, further comprising:
an input setting unit configured to be used by a user to input and set a standby time from a timing to start supplying carrier gas to a timing to start temperature control on the column oven,
wherein the analysis control unit selects between a time calculated by the time calculation unit or the time plus a predetermined extra time and the standby time set using the input setting unit and determines a timing to permit temperature control to be conducted on the column oven based on the selected time.

* * * * *